United States Patent Office 2,878,284
Patented Mar. 17, 1959

2,878,284

PROCESS FOR PREPARING SYMMETRICAL HEXACHLORODIPHENYL UREA

Robert T. K'Burg, Niagara Falls, N. Y., assignor to E. I. du Pont de Nemours & Company, Wilmington, Del., a corporation of Delaware No Drawing. Application June 9, 1945
Serial No. 598,661

3 Claims. (Cl. 260—553)

This invention relates to a new and improved process for the preparation of symmetrical hexachlorodiphenyl urea. More particularly, it relates to a new and improved method of controlling the amount of sulfuric acid added to the reaction mixture in the preparation of symmetrical hexachlorodiphenyl urea from 2,4,6-trichloroaniline and urea in glacial acetic acid.

One of the common procedures for the preparation of symmetrical hexachlorodiphenyl urea was a batch process wherein 2 mols of 2,4,6-trichloroaniline was reacted with 1 mol of urea in glacial acetic acid. According to this procedure, the reaction mixture was refluxed at atmospheric pressure for 2 hours, during which period sulfuric acid was added slowly, the amount of sulfuric acid being determined by spot tests uing methyl violet indicator paper.

The purpose of the sulfuric acid is to increase the yield and also to react and remove liberated ammonia from the field of reaction. If no sulfuric acid is employed in the reaction, the conversion of 2,4,6-trichloroaniline with urea to symmetrical hexachlorodiphenyl urea goes to approximately 22% of theory and the refluxing of the reaction mixture must be carefully watched because continued refluxing of the reaction mixture causes a disappearance of the symmetrical hexachlorodiphenyl urea which had been previously formed. If too much sulfuric acid is added to the reaction mixture, the desired product is not obtained or the formation of undesirable by-products results in a lowered yield. Thus, it is apparent that the proper amount of sulfuric acid added to the reaction is highly important for high yields.

The use of methyl violet as an indicator to control the amount of sulfuric acid added to the reaction mixture is unsatisfactory since, if insufficient acid is added, no color change will occur and consequently a low yield of the product is obtained. When methyl violet is used as the indicator, it will change color only when too much acid has been added, with the result that a reduced yield is obtained.

An object of this invention is to provide an improved process for the preparation of symmetrical hexachlorodiphenyl urea from 2,4,6-trichloroaniline, sulfuric acid and urea.

Another object of this invention is to provide a process for accurately controlling the amount of sulfuric acid to be added in the preparation of symmetrical hexachlorodiphenyl urea.

An additional object of the invention is to provide a continuous process for the preparation of symmetrical hexachlorodiphenyl urea.

A further object of the invention is to provide a continuous process for the preparation of symmetrical hexachlorodiphenyl urea from 2,4,6-trichloroaniline hydrochloride.

A still further object of the invention is to provide a process for the preparation of symmetrical hexachlorodiphenyl urea requiring a reduced amount of sulfuric acid.

Other and additional objects will become apparent hereinafter.

This invention is based on the discovery that 2,4,6-trichloroaniline or the hydrochloride thereof will react with urea in acetic acid and produce increased yields of symmetrical hexachlorodiphenyl urea when the amount of sulfuric acid added to the reaction mixture is controlled so that measurements of the reaction mixture made with a pH meter having glass and calomel electrodes will be between 1.0 and 2.0. The readings on the pH meter may not be true pH values of the reaction mixture but, whatever they may be, when the amount of feed of sulfuric acid is such that the reaction mixture is maintained or adjusted to give readings of 1.0 and 2.0 on the pH meter, improved yields are obtained. The objects of the invention are accomplished, in general, by adding sulfuric acid to the reaction mixture of 2,4,6-trichloroaniline and urea in acetic acid is such amounts to adjust or maintain the reaction mixture so that measurements thereof made with a pH meter having glass and calomel electrodes will read between 1.0 and 2.0. By controlling the sulfuric acid feed in accordance with this invention, not only are improved yields obtained but symmetrical hexachlorodiphenyl urea can be prepared by a continuous process utilizing either 2,4,6-trichloroaniline or the hydrochloride.

The details and manner of practicing the invention will become apparent from the following specific example:

*Example*

A charge of the following ingredients in the following proportions was made up and charged into a reactor having two separate feed inlets and a side arm outlet:

2,4,6-trichloroaniline hydrochloride equivalent to 148 grs. 2,4,6-trichloroaniline
92 grs. urea
500 cc. glacial acetic acid After the charge had been introduced into the reactor, it was heated and allowed to reflux at a temperature of 125° C.–132° C. During the refluxing, a feed consisting of a slurry (preheated to a temperature of 125° C.–132° C.) composed of 117 grs. of 2,4,6-trichloroaniline hydrochloride and 30 grs. of urea in 500 cc. of glacial acetic acid was added through one of the feed inlets at the rate of 25 cc. per minute. Concentrated sulfuric acid (66° Bé.) was fed throughout the course of the run through the other feed inlet at a rate which gave readings of 1.5 to 1.8 on the pH meter. The reaction slurry was allowed to spill out through the side arm outlet in an amount equal to the feeds and the symmetrical hexachlorodiphenyl urea was filtered off. The filtrate was used in making up the slurry continuously added to the reactor. The yield was 64% based on the 2,4,6-trichloroaniline hydrochloride used.

Theoretically, symmetrical hexachlorodiphenyl urea can be produced by reacting 2 mols of 2,4,6-trichloroaniline with 1 mol of urea. In practice, however, it is preferred to use an excess of urea and, in general, the urea is used in an amount of from 200% to 800% of the theoretical amount required.

Though the example has been described specifically in connection with the use of 2,4,6-trichloroaniline hydrochloride, the invention is not restricted thereto but is equally applicable with the use of 2,4,6-trichloroaniline. The use of the hydrochloride, however is preferred since 2,4,6-trichloroaniline is obtained upon hydrolysis of the hydrochloride which is prepared by the chlorination of aniline. The use of the hydrochloride thereby saves the hydrolysis operation. In addition, by using the hydrochloride, the hydrogen chloride thereof is utilized and the consumption of sulfuric acid in the reaction is substantially reduced thereby. For example, when the 2,4,6-trichloroaniline was used in the process, approximately 1.0 lb. of sulfuric acid per lb. of symmetrical hexachlorodiphenyl urea produced was necessary. When the hydrochloride was used, the sulfuric acid consumption was reduced to 0.5–0.6 lb. per lb. of product.

In the initial charge of the example, the hydrochloride is present in an amount which is equivalent to approximately 30% by weight of 2,4,6-trichloroaniline based on the glacial acetic acid, and the slurry which is added to the reactor throughout the run contains the hydrochloride in an amount equivalent to approximately 20% by weight of 2,4,6-trichloroaniline based on the feed. It is to be understood that the invention is not restricted to such concentrations. The range in ratio of 2,4,6-trichloroaniline to glacial acetic acid is limited to a minimum of 5% (below which no symmetrical hexachlorodiphenyl urea is produced) and a maximum which can be conveniently handled. However, high yields are obtained when the concentration of 2,4,6-trichloroaniline hydrochloride is equivalent to 25% to 35% of 2,4,6-trichloroaniline in the original charge and to 15% to 25% of 2,4,6-trichloroaniline in the feed.

The temperature range is limited to the boiling point of the reaction mixture, which obviously varies with the concentration of the reactants and by-products dissolved as well as the pressure on the reactor which, as shown by the example, is atmospheric pressure. However, the invention is not limited to atmospheric pressure, since it can also be carried out at pressures above atmospheric. The ratio of the reactants may be varied with different pressures, and this can be determined by simple empirical experiments. In general, the reaction pressure is not critical.

As shown by the example, it is preferred that the feed which is continuously added to the reactor be preheated to a temperature approximately equal to that of the reaction mixture in the reactor, since this improves conversion and yield. However, it is apparent that the feed which is added to the reaction mixture need not be preheated or, if preheated, not to the precise temperature set forth in the example. Likewise, the sulfuric acid may be similarly preheated or not, as desired.

The rate of addition of the feed to the reactor is important and depends on the design of the reactor. A too low feed rate will reduce yields and increase by-products. A too high rate of feed would result in incomplete conversion. Though in the example the feed was 25 parts (by volume) per minute, whereby approximately 0.6 part (by weight) of 2,4,6-trichloroaniline per minute was fed into the reactor, the invention is not restricted thereto. In general, a feed containing 17% to 20% by weight (based on the acetic acid content of 2,4,6-trichloroaniline or an amount of 2,4,6-trichloroaniline hydrochloride to give such a concentration of 2,4,6-trichloroaniline is fed into the reactor at a rate so that the contents of the reactor will be completely changed in an appropriate period of time, such as, for example, 2 to 3 hours. The feed contains urea in an amount of from 200% to 800% of the theoretical amount required for the reaction.

In the example, the concentrated sulfuric acid was added at a rate to maintain a measurement of from 1.5 to 1.8 on a pH meter having glass and calomel electrodes. Though this range is preferred, since it gives optimum results, nevertheless satisfactory results have been obtained when the readings have been maintained as low as 1.0 and as high as 2.0.

The measurements on the pH meter can be taken periodically or continuously throughout the course of the reaction. The electrodes of the pH meter can be inserted in the reaction mixture and continuous measurements taken, the sulfuric acid being added when necessary to keep the reaction within the desired range. Alternatively, periodic samples of the reaction mixture can be taken and, after cooling the samples to some reference temperature, say 30° C., the measurement can be taken. The sulfuric acid is then added, as necessary, to bring the reaction within the desired range of measurements on the pH meter.

Though the invention has been described in connection with a continuous process, to which it is particularly suitable, nevertheless the principles thereof, i. e. adding sulfuric acid to the reaction mixture in such amounts that measurements of the reaction mixture with a pH meter having glass and calomel electrodes will read between 1.0 and 2.0, can be utilized in a batch process for preparing symmetrical hexachlorodiphenyl urea by reacting 2,4,6-trichloroaniline and urea in acetic acid. In such a process, the ingredients are refluxed at atmospheric pressure for a period of time of from 1½ to 4 hours. During the reflux, the measurements are made on the pH meter either continuously or at predetermined times, as hereinbefore described, and sufficient sulfuric acid (66° Bé. added to give readings on the pH meter within the range of from 1.0 to 2.0, and preferably 1.5 to 1.8. After the reaction is completed, the reaction mixture is filtered to separate the symmetrical hexachlorodiphenyl urea. The latter carries with it the excess ammonium salts, which are removed by water washing. The symmetrical hexachlorodiphenyl urea is then dried.

The batch process above described is limited to the use of 2,4,6-trichloroaniline. If 2,4,6-trichloroaniline hydrochloride were employed in the batch process, there would be no way of disposing of the excess acidity due to the liberation of the hydrogen chloride from the hydrochloride, and the readings on the pH meter would not give any indication of the proper amount of sulfuric acid required. Nevertheless, by applying the principles of this invention to the batch process utilizing 2,4,6-trichloroaniline, improved yields are obtained.

The instant invention provides a method of accurately controlling the amount of sulfuric acid to be used in the process of preparing symmetrical hexachlorodiphenyl urea by reacting 2,4,6-trichloroaniline and urea in acetic acid. The method is operable with the batch process and has made it possible to produce symmetrical hexachlorodiphenyl urea by a continuous process. In the continuous process, not only can 2,4,6-trichloroaniline be used, but also the hydrochloride thereof. Not only is the continuous method a decided advance in the art, but it makes the production of symmetrical hexachlorodiphenyl urea more economical through the use of 2,4,6-trichloroaniline hydrochloride as hereinbefore described.

Since it is obvious that many changes and modifications can be made in the above-described details without departing from the nature and spirit of the invention, it is to be understood that the invention is not to be limited thereto except as set forth in the appended claims.

I claim:

1. In the process for the preparation of symmetrical hexachlorodiphenyl urea by reacting a substance selected from the group consisting of 2,4,6-trichloroaniline and the hydrochloride thereof with urea in acetic acid, the improvement which comprises feeding sulfuric acid to the reaction mixture during the reaction in such amounts that measurements of the reaction mixture with a pH meter having glass and calomel electrodes will give readings between 1.0 and 2.0.

2. In the process for the preparation of symmetrical hexachlorodiphenyl urea by reacting in a reactor a substance selected from the group which consists of 2,4,6-trichloroaniline and the hydrochloride thereof with urea in acetic acid, the improvement which comprises continuously feeding a slurry comprising the reactants and acetic acid into the reactor, continuously withdrawing reaction mixture containing the product from the reactor, and feeding sulfuric acid to the reaction mixture in the reactor in such amounts that measurements of the reaction mixture with a pH meter having glass and calomel electrodes will give readings of from 1.0 to 2.0.

3. In the process for the preparation of symmetrcial hexachlorodiphenyl urea by reacting in a reactor a substance selected from the group which consists of 2,4,6-trichloroaniline and the hydrochloride thereof with urea in acetic acid, the improvement which comprises continuously feeding a slurry containing the reactants and acetic acid into the reactor, continuously withdrawing reaction mixture containing the product from the reactor, and feeding sulfuric acid to the reaction mixture in the reactor in such amounts that measurements of the reaction mixture with a pH meter having glass and calomel electrodes will give readings of from 1.0 to 2.0, the rate of withdrawal of reaction mixture from the reactor being substantially equal to the feeds thereto.

No references cited.